United States Patent [19]

Piesch et al.

[11] Patent Number: 4,764,570
[45] Date of Patent: Aug. 16, 1988

[54] SULPHONAMIDE DERIVATIVES AND THEIR PREPARATION AND USE

[75] Inventors: Steffen Piesch, Oberursel; Peter Dörries, Frankfurt, both of Fed. Rep. of Germany

[73] Assignee: Cassella Aktiengesellschaft, Frankfurt am Main, Fed. Rep. of Germany

[21] Appl. No.: 34,601

[22] Filed: Apr. 6, 1987

[30] Foreign Application Priority Data

Feb. 20, 1985 [DE] Fed. Rep. of Germany ....... 3505766

[51] Int. Cl.$^4$ ...................... C08G 12/32; C08G 12/40
[52] U.S. Cl. .................................... 525/513; 528/265; 528/266
[58] Field of Search ................. 525/513; 528/265, 266

[56] References Cited

U.S. PATENT DOCUMENTS 4,247,433  1/1981  Schamberg et al. ................. 524/843
4,430,494  2/1984  Hönel et al. ......................... 528/265

FOREIGN PATENT DOCUMENTS 869436   8/1977  Belgium .
2825590  12/1979  Fed. Rep. of Germany .
53-101091  9/1978  Japan ................................. 525/513
2003897   3/1979  United Kingdom .

Primary Examiner—Lucille M. Phynes
Attorney, Agent, or Firm—Connolly and Hutz

[57] ABSTRACT

Sulphonamide compounds of the formula

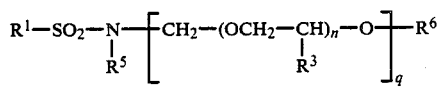

are prepared by condensation of sulphonamides of the formula

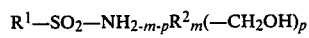

with formaldehyde and diols or diol monoethers of the formula

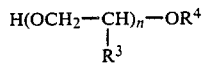

in a molar ratio of sulphonamide: formaldehyde: diol or diol monether of 1:(1-p):0.5 to 1:(4-p):6 in the presence of a catalyst which splits off water and at temperatures of 80° to 250° C., wherein $R^1$ is phenyl, phenyl substituted phenyl, or alkyl substituted phenyl having 1 to 4 alkyl carbon atoms,
$R^2$ is alkyl having 1 to 4 carbon atoms,
$R^3$ is hydrogen or alkyl having 1 to 4 carbon atoms,
$R^4$ is hydrogen or alkyl having 1 to 18 carbon atoms,
$R^5$ is hydrogen, $R^2$,

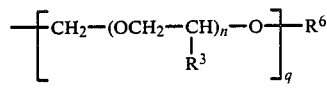

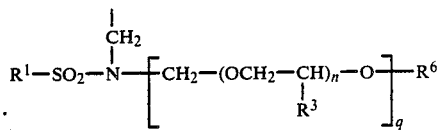

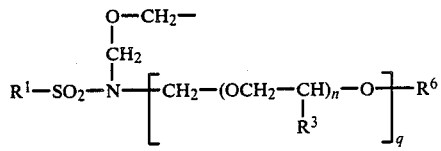

or

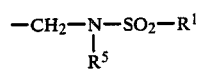

$R^6$ is $R^4$ or

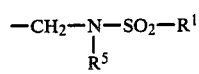

m is zero or one,
p is zero, one or two with the sum of m and p ranging from 0 to 2, and
n is a number from 2 to 19
q is one, two or three
and the compounds so obtained are used as modifying agents for melamine resins.

4 Claims, No Drawings

SULPHONAMIDE DERIVATIVES AND THEIR PREPARATION AND USE

This is a division of Ser. No. 824,598, filed Jan. 31, 1986, now abandoned.

The present invention relates to sulphonamide derivatives, and in particular mixtures thereof, which can be prepared by condensation of sulphonamides of the formula I with formaldehyde and diols or diol monoethers of the formula II

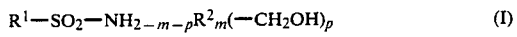

$$R^1-SO_2-NH_{2-m-p}R^2{}_m(-CH_2OH)_p \quad (I)$$

$$H(OCH_2-CH)_n-OR^4 \quad (II)$$
$$\quad\; |$$
$$\;\; R^3$$

and to their use as modifying agents for melamine resins.

By melamine resins, the expert understands precondensates of melamine with formaldehyde, all or some of the free methylol groups of which can be etherified with alkanols having 1 to 5 C atoms. These precondensates have a degree of condensation which is so high that the products still melt or at least soften at elevated temperature and, after a certain period of flowability, harden completely, with further crosslinking.

Melamine/formaldehyde precondensates, the methylol groups of which are not etherified or etherified up to the extent of 10–20%, are as a rule prepared and also marketed commercially in an aqueous medium. They are preferably used for impregnating paper webs, in particular decorative paper webs, which are then used for the production of laminates, for example decoratively coated chipboard or moulded laminates. If pure malaime/formaldehyde precondensates are used for the production of such laminates, the resulting laminates as a rule have certain technological disadvantages. Thus, in most cases, adequate gloss of the surface can only be obtained if very severe hardening of the surface is carried out, which in turn leads to disadvantages in respect of the elasticity and tear strength of these surfaces. Other known disadvantages which result when pure malaime/formaldehyde condensation products are used are, for example, inadequate resistance towards water, alkalis, steam or dry or moist heat treatment. The gloss and uniformity of the surface, that is to say the flow of the resin during the pressing operation, may also be inadequate, bubbles and craters may form, and dusting may occur after the impregnation operation.

To avoid such disadvantages of the pure, optionally partly etherified melamine/formaldehyde precondensates, addition of so-called modifying agents to the aqueous solutions of these resins during or after the condensation has been known for a long time. Examples of known modifying agents are sodium sulphamate, polyalcohols, such as sorbitol or sucrose, carboxamides, such as, for example, caprolactam, formamide and formamide derivatives, such as, for example, methylene-bis-formamide, and also aromatic sulphonamides, in particular toluenesulphonamide.

The addition of aromatic sulphonamides, in particular toluenesulphonamide, to aqueous melamine impregnating resins leads to surfaces which have a very good gloss and outstanding uniformity, coupled with good elasticity, when these resins are used for the production of laminates. Sulphonamide-modified aminotriazine resins are described, for example, in U.S. Pat. No. 4,133,843; Belgian Patent Specification No. 869,436 (corresponding to UK Pat. No. 2,003,897) and German Patent Specification No. 2,825,590 (corresponding to U.S. Pat. No. 4,247,433) relate to the addition of sulphonamide to urea resins. An acetoguanamine/sulphonamide/formaldehyde condensation product is known from Japanese Preliminary Published Specification No. 54-112,994, and Japanese Preliminary Published Specifications No. 53-094,589 and No. 54-112,992 relate to sulphonamide-modified phenol/formaldehyde resins. A disadvantage of the melamine resins modified with sulphonamides is that they frequently have a shorter storage life than the unmodified products, that is to say they gel earlier and can then no longer be used for the intended purpose as an impregnating resin. In addition, the storage life of the malamine resins modified with sulphonamides shows a certain scatter which makes it difficult to give exact information on the storage life and thus introduces a considerable uncertainty into the time and stock schedules of the user. Another disadvantage of using sulphonamides as modifying agents for melamine resins lies in the field of production of these products. The production is subject to very narrow tolerances for the time of addition of these modifying agents to the resin batches. If these narrow tolerances are exceeded, it may occur that the storage life of the resins is very drastically reduced, or even that the batches already gel during production. On the other hand, it may occur that the sulphonamides added no longer dissolve completely in the melamine/formaldehyde precondensate to be modified and that, on the one hand, filtration is necessary for clarification of the resin and, on the other hand, the full gloss or the full elasticity on the laminate surface obtained with such resins cannot of course be achieved.

It has now been found that the disadvantages of using sulphonamides as modifying agents for melamine resins can be avoided if sulphonamide derivatives, and in particular their mixtures or solutions in diols or diol monoethers of the formula II, which can be prepared by condensation of sulphonamides of the formula I

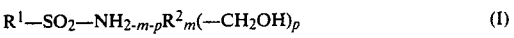

$$R^1-SO_2-NH_{2-m-p}R^2{}_m(-CH_2OH)_p \quad (I)$$

wherein $R^1$ denotes an optionally substituted phenyl nucleus, $R^2$ denotes alkyl, m represents zero or 1, p represents zero, 1 or 2 and $0 \leq (m+p) \leq 2$, with formaldehyde and diols or diol monoethers of the formula II

$$H(OCH_2-CH)_n-OR^4 \quad (II)$$
$$\quad\; |$$
$$\;\; R^3$$

wherein $R^3$ denotes hydrogen or alkyl, $R^4$ denotes hydrogen or alkyl and n represents a number from 2 to 19, preferably 2 to 4, are used for the modification.

In the sulphonamides of the formula I, the phenyl nucleus represented by $R^1$ is either unsubstituted or substituted by 1 to 3 alkyl groups with a total of up to 12 C atoms, preferably with a total of up to 4 C atoms, or by an aryl radical, in particular a phenyl radical.

$R^1$ is preferably unsubstituted phenyl or phenyl which is substituted by an alkyl group, the alkyl group having 1 to 4, in particular 1 or 2, C atoms.

An alkyl group represented by $R^2$ has 1 to 4, preferably 1 or 2, C atoms.

Particularly advantageous sulphonamides of the formula I are benzenesulphonamide, o- or p-toluenesulphonamide, technical grade toluenesulphonamide mixtures, N-methyl-benzenesulphonamide, xylenesulphonamide, N-methyl-toluenesulphonamide, N-methylolbenzenesulphonamide, N-methylol-toluenesulphonamide, N,N-dimethylol-toluenesulphonamide, N-methylol-N-methyl-toluenesulphonamide and diphenylsulphonamide.

An alkyl group represented by $R^3$ has 1 to 4, preferably 1 or 2, C atoms.

An alkyl group represented by $R^4$ has 1 to 18, preferably 1 to 4, C atoms.

1 to 4 moles of formaldehyde and 0.5 to 4 moles of the diol or diol monoether are reacted with one another per mole of the sulphonamide of the formula I.

If only the sulphonamide is first reacted with formaldehyde in carrying out the condensation according to the invention, methylolation of the sulphonamide occurs. The N-methylol-sulphonamide thereby formed then reacts with the diol or diol monoether component to give the same end products as are obtained when all the components are mixed from the start. Correspondingly, it is also possible to start from previously prepared N-methylolsulphonamides ($p \neq 0$) using one mole less of formaldehyde per mole of N-methylol group present.

If a sulphonamide of the formula I in which p is not zero is used, 1-p to 4-p moles of formaldehyde are accordingly used per mole of the sulphonamide. The value of 1-p cannot of course be negative, but is at least 0.

If mixtures of sulphonamides of the formula I in which the components of the mixture differ in the values of m and/or p are used, intermediate values may also result, purely by calculation, for these symbols. The amount of formaldehyde can then be calculated as described above, using these intermediate values.

Where the formaldehyde employed is not bonded to the amide group of the sulphonamide during the condensation, it reacts largely with OH groups of the diol or diol monoether components to give acetals. It is thus no longer in the free form in the condensation products according to the invention.

An excess of diol or diol monoether of the formula II can also be employed in the condensation and then serves as a solvent for the reaction. If this procedure and the use of the products according to the invention as such is intended, up to 6 moles of the diol or diol monoether can advantageously be employed per mole of the sulphonamide of the formula I.

In principle, it is also possible to increase the amount of diol or diol monoether component still further. However, this brings no further advantages, since in this case the condensation product according to the invention is diluted even further. In the context of the above statements, the molar ratio of the components of the formulae I and II and the formaldehyde is advantageously chosen so that at least 2 moles of protons from —$NH_2$ or —NH— and —OH groups are present in the condensation batch per mole of formaldehyde.

Preferably, the sulphonamide, formaldehyde and diol or diol monoether are mixed with one another in a molar ratio of 1:1:1 to 1:4:6 and subjected to condensation.

In the context of the abovementioned limits, the molar ratios of sulphonamide/formaldehyde and diol or diol monoether can be varied independently of one another. Thus, for example, copolymers according to the invention can be prepared by condensation of the 3 starting materials at the limits of the molar ratio range of sulphonamide:formaldehyde:diol or diol monoether of 1:1:0.5 or 1:2:2 or 1:4:6, but also in the intermediate range, for example 1:1.5:1 or 1:2:1.5 or 1:2.5:3.5. In principle, for a moles of sulphonamide, all the values from 1a to 4a moles of formaldehyde and 0.5a to 6a moles of diol or diol monoether can be employed, with all the intermediate values. It should be remembered here merely that as a rule only the amount of diol or diol monoether can be incorporated in the product according to the invention such that all the methylol groups formed by the formaldehyde present are etherified, that is to say if x moles of formaldehyde have been used in the condensation, wherein $1 < x < 4$, as a rule also a maximum of x moles of diol or diol monoether are incorporated in the product according to the invention. Any excess of diol or diol monoether present thereby remains free.

A possible excess of diol or diol monoether can be removed from the product according to the invention in a manner which is known per se, for example by extraction, but advantageously by distillation. However, it is not necessary to remove this excess quantitatively in all cases, and on the contrary it may even be advantageous to leave certain amounts of diol or diol monoether in the sulphonamide derivatives of the formula I according to the invention or their mixtures, since additional technological advantages may result from this.

The reaction between the sulphonamide, formaldehyde and the diol or diol monoether is carried out at temperatures between 80° and 250° C., preferably between 100° and 200° C., in the presence of known catalysts which split off water, preferably an acid catalyst. Examples of suitable acid catalysts are inorganic or strong organic acids, such as, for example, hydrochloric acid, sulphuric acid, nitric acid, phosphoric acid, formic acid, oxalic acid and benzenesulphonic acid, and also acid salts, such as, for example, monoalkali metal sulphates, and, in particular, amidosulphonic acid.

To accelerate and bring to completion the removal of the water of reaction from the reaction equilibrium, it is also possible to carry out the reaction in vacuo, especially towards the end thereof.

The reaction of the sulphonamides of the formula I with the formaldehyde and the diol or diol monoether of the formula II can be carried out without an organic solvent or in the presence of an organic solvent. Examples of suitable organic solvents are inert solvents, such as aliphatic hydrocarbons, for example petroleum fractions, with a boiling point from 100° to 250° C., in particular 120° to 200° C., or aromatic hydrocarbons and chlorohydrocarbons with a boiling point of 100° to 250° C., in particular 120° to 200° C. It is particularly advantageous to use inert aromatic hydrocarbons as solvents for carrying out the reaction if the formaldehyde is to be employed in the form of aqueous formaldehyde, since the removal of the water entrained is then promoted by azeotropic distillation. It is particularly advantageous to use, as the organic solvent, an excess of the diol or diol monoether employed in the reaction.

The formaldehyde can be used in the form of an aqueous solution, preferably a solution which is more than 30% strength, or in the form of a solution of formaldehyde gas in the diol or diol monoether employed in the reaction, or in a low-boiling alkanol. However, the formaldehyde is preferably added to the reaction in the form of paraformaldehyde. If aqueous solutions of formaldehyde or solutions in low-boiling alkanols are employed, it should be ensured that the water or lower alkanol introduced with the formaldehyde solution can be distilled off from the reaction mixture, which, especially if water is present, is promoted by addition of an organic solvent with which water forms an azeotropic mixture.

Those products according to the invention and embodiments of the preparation process in which several of the abovementioned preferred features are combined are particularly preferred.

The sulphonamide condensation products obtainable according to the invention consist of sulphonamide derivatives, or mixtures thereof, of the formula III

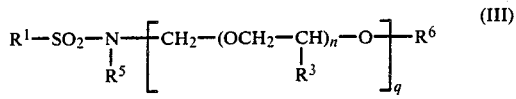

wherein
$R^5$ denotes hydrogen,
$R^2$ hydroxymethyl or a group of the formulae IV

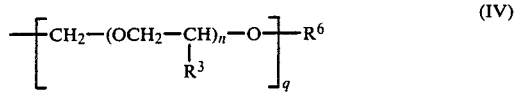

or V

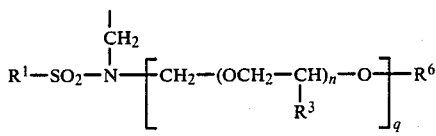

or VI

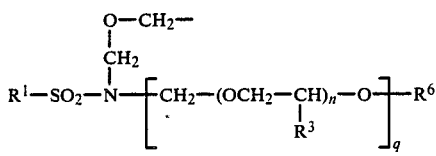

or VII

$R^6$ denotes $R^4$ or a group of the formula VII,
q denotes the number 1, 2 or 3 and
$R^1$, $R^2$, $R^3$, $R^4$ and n have the meanings already stated, if appropriate mixed with the formaldehyde acetal of the diol or diol monoether component employed, and, if appropriate, excess diol or diol monoether as the solvent.

Preferably q is the number 1. Compounds and mixtures of compounds of the formula I with a low degree of crosslinking are preferred.

In the components of the formula III of the mixtures according to the invention, the meanings of q and the radicals $R^5$ and $R^6$ are in random distribution, the proportional amounts depending on the molar ratio of the starting materials before the condensation and having values such that the analytical mean of the sulphonamide, formaldehyde and glycol or glycol monoether components, after splitting back, are preferably in the range of the molar ratios of 1:1:0.5 to 1:4:4.

Although the individual substances of the above formula III which can be isolated from the products according to the invention are particularly suitable as modifying agents for melamine resins and offer the advantages mentioned, it is more advantageous to employ mixtures of these substances, since these mixtures are liquid and also remain liquid after prolonged storage and at low temperatures, and are therefore very easy to apply and moreover are also easier to prepare, since isolation of individual substances is not necessary.

In the preparation of mixtures according to the invention of sulphonamide derivatives, up to 20% of the sulphonamide component can be replaced by known modifying agents, containing carboxamide groups, for aminoplast resins, such as, for example, formamide and, in particular, caprolactam.

The crude condensation products according to the invention, which are preferably used as such, have a far better solubility, if they are solid, in the resin batches than the sulphonamides previously used. Where they are liquid or are present as a solution in excess diol or diol monoether component, only a completely problem-free admixing is necessary. Those products according to the invention with crude melting points below 50° C. are therefore preferred. These modifying agents can be added at virtually any phase of the malamine resin preparation, and the resins thus obtained show an exceptionally low scatter in their properties, in particular their storage life, from batch to batch. The storage life of the malamine resins thus modified is higher than the average storage life of the resins modified conventionally with sulphonamides, and they also have a very high and uniform quality in respect of the gloss and elasticity properties of the laminates produced with them. If the products according to the invention are added to the malamine resin batches before or even during condensation thereof, even additional increases in gloss in comparison with the use of conventional sulphonamides frequently result.

Particularly useful resins are obtained if the sulphonamide derivatives according to the invention are added to melamine resins with a molar ratio of melamine:formaldehyde of 1:1.14 to 1:1.65.

The sulphonamide derivatives according to the invention or mixtures thereof are added to the resins to be modified in an amount of 1 to 20% by weight, preferably 2 to 10% by weight, based on the solids content of the resin, it being possible for the addition to take place before, during or after the condensation of the resin, as already mentioned above. Addition before or at the start of the condensation is particularly advantageous. This measure brings both technological advantages and also an additional increase in quality with many resins. The coated materials produced with such resins frequently show a considerably increased gloss.

The resulting resins modified according to the invention have a very uniform quality and excellent storage stability and can be processed in the customary manner on all the usual types of machine, both on multi-daylight presses with recooling and by the short-cycle process, to give laminates, in particular decoratively coated timber-derived products and moulded laminates. The surfaces of the resulting laminates are very resistant chemically and mechanically, have a high elasticity, are free from cracks and exhibit a very high and uniform gloss.

Decoratively coated timber-derived product boards are produced using the aminoplasts according to the invention by impregnating the paper or fabric web with an aminoplast according to the invention and further processing the impregnated web in a manner which is known per se. The impregnated and dried paper or fabric web is thus pressed onto the prepared timber-derived product board under pressures of about 10 to 100 bar at temperatures of about 120° to 180° C., multi-daylight presses advantageously being used for the pressing. Analogously, if carrier webs impregnated with phenolic resin are used instead of the timber-derived product boards, laminates can be produced using pressing pressures of about 50 to 150 bar and temperatures of about 120° to 180° C. Numerous and detailed references to the production of coated timber-derived boards and laminates are found in the literatures such as in J. F. Blais, Amino Resins, Reinhold Publishing Corp., New York (1959), pages 122 to 138; C. P. Vale, Aminoplastics, London, Cleaver-Hume Press Ltd. (1950), pages 209 to 214, and Ullmanns Encyclopä die der techn, Chemie ("Ullmann's Encyclopedia of Industrial Chemistry"), 4th Edition, pages 417 to 418.

Precrosslinked reaction products of sulphonamides with formaldehyde are already known and have been used, for example, as pigment carriers in accordance with German Offenlegungsschrift No. 2,608,864 and U.S. Pat. No. 4,079,026, as a constituent of dispersing agents in accordance with U.S. Pat. No. 4,113,650 and as hot-melt adhesives for shoe production in accordance with Russian Patent Specification No. 594,156. These known products differ from the products of the formula I according to the invention in that they are not etherified with diols or diol monoethers and that, in contrast to the products according to the invention, they have a high degree of precrosslinking.

The following embodiment examples illustrate the present invention and can be varied in the context of the above description and the claims.

®Granuform, which is used in the Examples, is technical paraformaldehyde, 90% by weight, the rest being water. ®Granuform is a trademark registered to the firm of Degussa, Frankfurt am Main, West Germany.

EXAMPLE 1

170 g of technical grade toluensulphonamide, 300 g of diethylene glycol, 35 g of paraformaldehyde ®Granuform and 1 g of potassium bisulphate are warmed to 120° C., in the course of 30 minutes and with stirring, in a 1 liter three-necked flask with a stirrer, thermometer and descending condenser, a clear solution being formed. The batch is now stirred at 120° C. and the water formed during the condensation is distilled off. After 6 hours, the splitting off of water has ended and the reaction product is cooled to room temperature.

530 g of a solution of a sulphonamide derivative according to the invention, containing co-condensed sulphonamide, formaldehyde and diol component in a molar ratio of 1:1:1, in diethylene glycol are obtained.

A product with very similar technological properties is obtained if the 300 g of diethylene glycol employed above is replaced by the same amount of diethylene glycol monomethyl ether and 2 g of amidosulphonic acid is employed instead of potassium bisulphate.

EXAMPLE 2

170 g of p-toluenesulphonamide, 300 g of diethylene glycol, 70 g of paraformaldehyde and 1 g of potassium bisulphate are warmed to 130° C., in the course of 30 minutes with stirring, in a 1 liter three-necked flask with a stirrer, thermometer and descending condenser, a clear solution being formed. The batch is now stirred at 135° C. and the water formed during the condensation is distilled off. After 5 hours, the splitting off of water has ended and the reaction product is cooled to room temperature. 500 g of a solution of a sulphonamide derivative according to the invention, which contains co-condensed sulphonamide, formaldehyde and diol component in a molar ratio of 1:2:2, in diethylene glycol are obtained.

EXAMPLE 3

500 g of p-toluenesulphonamide, 900 g of triethylene glycol and 180 g of ®Granuform are warmed to 90° C., in the course of 30 minutes, in a 2 liter three-necked flask with a stirrer, thermometer and descending condenser, and the mixture is stirred at this temperature until a clear solution forms. Thereafter, 5 ml of formic acid are added dropwise and stirring is continued at 120° C., the water formed during the condensation being distilled off. After 2 hours, the temperature is increased to 140° C. and stirring is continued. After 8 hours, the splitting off of water has ended and the reaction product is cooled to room temperature.

1,480 g of a solution of a sulphonamide derivative according to the invention, which contains co-condensed sulphonamide, formaldehyde and diol component in a molar ratio of 1:2:2, in triethylene glycol are obtained.

EXAMPLE 4

1,900 g of technical grade toluenesulphonamide, 3.5 l of triethylene glycol, 670 g of paraformaldehyde and 50 g of potassium bisulphate are warmed to 145° C., in the course of 30 minutes with stirring, in a 5 liter three-necked flask with a stirrer, thermometer and descending condenser, a clear solution being formed.

The batch is now stirred at 150° C. and the water formed during the condensation is distilled off. After 8 hours, the splitting off of water has ended, and the reaction product is cooled to room temperature.

3,077 g of a solution of a sulphonamide derivative according to the invention, which contains co-condensed sulphonamide, formaldehyde and diol component in a molar ration of 1:2:2, in triethylene glycol are obtained.

EXAMPLE 5

802 g of technical grade toluenesulphonamide, 1,415 g of diethylene glycol, 682 ml of aqueous 39% strength by weight formaldehyde solution and 4.7 g of potassium bisulphate are warmed to 95° C., in the course of 30 minutes with stirring, in a 4 liter three-necked flask with a stirrer, thermometer and descending condenser, a clear solution being formed.

The batch is now stirred at 130° C. and the water is distilled off. After 6 hours, the splitting off of water has ended, and the reaction product is cooled to room temperature.

2,285 g of a solution of a sulphonamide derivative according to the invention, which contains co-condensed sulphonamide, formaldehyde and diol component in a molar ratio of 1:2:2, in diethylene glycol are obtained.

EXAMPLE 6

2.17 l of diethylene glycol, 1,965 g of toluenesulphonamide (technical grade), 690 g of paraformaldehyde (90% strength, ®Granuform) and 22 g of potassium bisulphate are warmed to 90° C., in the course of 30 minutes with stirring, in a 5 liter three-necked flask with a stirrer, thermometer and descending condenser, and the mixture is kept at this temperature until a clear solution is formed.

The batch is now stirred at 140° C. and the water formed during the condensation is distilled off initially under open conditions for 12 hours and then under a water pump vacuum (15 mbar) for a further 12 hours. Thereafter, the splitting off of water has ended, and the reaction product is cooled to room temperature.

4,460 g of a 94.9% strength by weight solution of a sulphonamide derivative according to the invention, which contains co-condensed sulphonamide, formaldehyde and diol component in a molar ratio of 1:2:2, in diethylene glycol are obtained.

EXAMPLE 7

760 g of toluenesulphonamide (90% strength by weight, remainder=water), 840 of diethylene glycol, 200 g of polyethylene glycol, molecular weight 400, 5 g of ®Emulsogen EL (commercially available emulsifying agent), 265 g of paraformaldehyde and 15 g of potassium bisulphate are warmed to 100° C., in the course of 50 minutes with stirring, in a 3 liter three-necked flask with a stirrer, thermometer and descending condenser, a clear solution being formed.

The batch is now stirred at 140° C. and the water formed during the condensation is distilled off under open conditions for 12 hours and then under a water pump vacuum (15 mbar) for a further 3 hours. Thereafter, the splitting off of water has ended, and the reaction product is cooled to room temperature.

1,830 g of a sulphonamide derivative according to the invention, which contains co-condensed sulphonamide, formaldehyde and diol component in a molar ratio of 1:2:2, are obtained.

EXAMPLE 8

285 g of toluenesulphonamide, 600 g of polyglycol, molecular weight 200, 97.5 g of paraformaldehyde and 3 g of potassium bisulphate are warmed to 100° C., in the course of 20 minutes with stirring, in a 2 liter three-necked flask with a stirrer, thermometer and descending condenser, and the mixture is kept at this temperature for 1 hour, a clear solution being formed.

The batch is now stirred at 130° C. for 2 hours and 145° C. for 2 hours and the water formed during the condensation is distilled off. Thereafter, the splitting off of water has ended, and the reaction product is cooled to room temperature.

920 g of a sulphonamide derivative according to the invention, which contains co-condensed sulphonamide, formaldehyde and diol component in a molar ratio of 1:2:2, are obtained.

EXAMPLE 9

500 g of toluenesulphonamide (technical grade, 90% strength by weight), 800 g of dipropylene glycol, 90 g of paraformaldehyde (90% strength by weight) and 10 g of amidosulphonic acid are warmed to 100° C., in the course of 30 minutes with stirring, in a 2 liter three-necked flask with a stirrer, thermometer and descending condenser, a clear solution being formed.

The batch is now stirred at 130° C. and the water formed during the condensation is distilled off, initially under open conditions and then under a water pump vacuum (15 mbar). After 6 hours, the splitting off of water has ended, and the reaction product is cooled to room temperature. 1,190 g of an 81% strength by weight solution of a sulphonamide derivative according to the invention, which contains co-condensed sulphonamide, formaldehyde and diol component in a molar ratio of 1:1:1, in dipropylene glycol are obtained.

EXAMPLE 10

190 g of toluenesulphonamide, 400 g of a diol of the formula

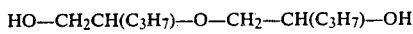
$$HO-CH_2CH(C_3H_7)-O-CH_2-CH(C_3H_7)-OH$$

65 g of paraformaldehyde and 1 g of potassium bisulphate are warmed to 135° C., in the course of 30 minutes with stirring, in a 1 liter three-necked flask with a stirrer, thermometer and descending condenser, a clear solution being formed.

The batch is now stirred at 135°–140° C. and the water formed during the condensation is distilled off. After 12 hours, the splitting off of water has ended, and the reaction product is cooled to room temperature. 574 g of a sulphonamide derivative according to the invention, which contains co-condensed sulphonamide, formaldehyde and diol component in a molar ratio of 1:2:2, are obtained.

EXAMPLE 11

500 g of toluenesulphonamide, 200 ml of diethylene glycol, 45 g of paraformaldehyde and 10 g of potassium bisulphate are warmed to 140° C., in the course of 30 minutes with stirring, in a 2 liter three-necked flask with a stirrer, thermometer and descending condenser, a clear solution being formed.

The batch is now stirred at 140° C. for 2 hours and the water formed during the condensation is distilled off. The batch is then cooled to 90° C., a further 200 ml of diethylene glycol and 90 g of paraformaldehyde are added, and the batch is heated again to 140° C. After a further hour, the splitting off of water has ended, and the reaction product is cooled to room temperature. 972 g of a 94.5% strength by weight solution of a sulphonamide derivative according to the invention, which contains co-condensed sulphonamide, formaldehyde and diol component in a molar ratio of 2:3:2, in diethylene glycol are obtained.

EXAMPLE 12

171 g of a technical grade mixture of o- and p-toluenesulphonamide, 45 g of formamide, 55 g of caprolactam, 650 g of diglycol, 200 g of ®Granuform and 20 g of amidosulphonic acid are stirred at 100° C. for 1 hour and the mixture is then heated to an internal temperature of 135° C. and the water of reaction is distilled off under nitrogen (finally under a slight vacuum). When 125 ml of water have been distilled off, the batch is cooled and decanted. A virtually colourless oil with the following characteristic data is obtained:

$V_{H_2O}$ 1: 0.9 [Water dilutability]

Density: 1.178.

The product can be used in this form as a modifying agent, or after the amidosulphonic acid has been neutralized with 8 g of NaOH.

A similar result is obtained if the formamide is left out of the above batch and the amount of caprolactam is increased to 110 g.

The sulphonamide derivatives according to the invention in Table 1 can also be prepared analogously to the statements in Examples 1 to 12 and are particularly suitable as modifying agents for melamine resins.

10 g of the sulphonamide mixture of Example 1 according to the invention are introduced into batch 14a.

The resulting resins are brought to a solids content of 60% by weight by addition of water and are introduced into bottles.

EXAMPLES 15 and 15a

Two resin batches as described in Examples 13 and 13a are subjected to condensation up to a water-dilutability of 1:2.2.

TABLE 1

| Example No. | Sulphonamide of the formula I (moles) Carboxamide (moles) | Formaldehyde: Solvent and % content of the solution (moles) | Diol or diol monoether | Catalyst | Reaction temperature |
|---|---|---|---|---|---|
| I |  (1 mole) | ® Granuform** (3 moles) | Triglycol (5 moles) | 10 g of $H_2NSO_3H$ | 135° C. |
| II | Biphenyl-sulphonamide (0.1 mole) + TSA* (0.9 mole) | ® Granuform (2.5 moles) | Triglycol (1.5 moles) + diglycol (1.5 moles) | 10 g of $H_2NSO_3H$ | 140° C. |
| III | Xylene-mono-sulphonamide (technical grade mixture) (1 mole) | ® Granuform (2.5 moles) | Triglycol (1.5 moles) + diglycol (1.5 moles) | 10 g of $H_2NSO_3H$ | 140° C. |
| IV | Mesitylene-mono-sulphonamide (1 mole) | ® Granuform (3 moles) | Triglycol (4 moles) | 15 g of $H_2NSO_3H$ | 140° C. |

*TSA = technical grade toluenesulphonamide
** R Granuform = technical grade paraformaldehyde, 90% strength by weight (remainder = water)

The considerable differences in the storage life of resins to which toluenesulphonamide has been added before the condensation, after condensation at 60° C. and after cooling to 25° C. and the considerably more favourable storage life figures which result when the toluenesulphonamide is replaced by the product of Example 1 according to the invention are illustrated by the following embodiment examples 13 to 15 and 13a to 15a.

EXAMPLES 13 and 13a

In each case 252 g of melamine, 260 g of a 39% strength by weight aqueous formaldehyde solution, 50 g of methanol and 0.5 g of potassium carbonate are heated to 90° C. in the course of 30 to 40 minutes with stirring in two three-necked flasks with a capacity of 2 liters, and the mixture is subjected to a condensation at this temperature up to a water-dilutability of 1:2.2 (duration: 4 hours).

10 g technical grade toluenesulphonamide, in the case of batch 13, and 10 g of the sulphonamide mixture of Example 1 according to the invention, in the case of batch 13a, are then immediately introduced at 90° C. and the batches are cooled to 25° C. in the course of 1.5 hours, with stirring.

The resulting resins are brought to a solids content of 60% by weight by addition of water and are introduced into bottles.

EXAMPLES 14 and 14a

Two resin batches as described in Examples 13 and 13a are subjected to condensation up to a water-dilutability of 1:2.2.

The two batches are then cooled, with stirring, so that they reach 25° C. in the course of 1.5 hours. As soon as the batches reach 65° C., 10 g of technical grade toluenesulphonamide are introduced into batch 14 and 10 g of the sulphonamide mixture of Example 1 according to the invention are introduced into batch 14a.

The resulting resins are brought to a solids content of 60% by weight by addition of water and are introduced into bottles.

The two batches are then cooled, with stirring, so that they reach 25° C. in the course of 1.5 hours. As soon as the batches reach 35° C., 10 g of technical grade toluenesulphonamide are introduced into batch 15 to 10 g of the sulphonamide mixture of Example 1 according to the invention are introduced into batch 15a.

The resulting resins are brought to a solids content of 60% by weight by addition of water and introduced into bottles and the storage stability is determined.

The following Table 2 shows the times which elapse before the first cloudiness or before the start of gelling of resins 13 to 15 and 13a and 15a (storage life test).

TABLE 2

| Resin according to Example No. | Mean storage stability (days) |
|---|---|
| 13 | significant cloudiness after 3 days |
| 13a | slight cloudiness after 14 days |
| 14 | significant cloudiness after 10 days |
| 14a | slight cloudiness after 21 days |
| 15 | significant cloudiness immediately after addition |
| 15a | slight cloudiness after 14 days |

EXAMPLES 13b, 14b and 15b

If instead of in each case 10 g of the sulphonamide mixture according to the invention in each case 30 g of this product are added to batches 13a, 14a and 15a, the following storage stabilities result: 13b: 10 days; 14b: 18 days; 15b: 12 days.

EXAMPLES 16 and 16a

In each case 252 g of melamine, 225 g of a 39% strength by weight aqueous formaldehyde solution and 13.6 g of diethylene glycol are mixed, with stirring, in two three-necked flasks each with a capacity of 2 liters, and the pH value is brought to 9.6 to 9.9 by addition of 10% strength by weight aqueous KOH solution (about 3-4 ml).

A mixture of 11 g of technical grade toluenesulphonamide and 14 g of diethylene glycol is then stirred into batch 16 and 25 g of the sulphonamide mixture of Example 6 according to the invention are stirred into batch 16a.

The two batches are then warmed to 90°–95° C. in the course of 30–40 minutes and are subjected to condensation at this temperature up to a water-dilutability of 1:0.8 (duration about 4 hours) and subsequently cooled to 25° C. in the course of 1.5 hours, with stirring.

The resulting resins are brought to a solids content of 60% by weight by addition of water and introduced into bottles.

EXAMPLES 17 and 17a

In each case 252 g of melamine, 225 g of a 39% strength by weight aqueous formaldehyde solution and 13.6 g of diethylene glycol are mixed, with stirring, in two three-necked flasks, each with a capacity of 2 liters, and the pH value is brought to 9.6 to 9.9 by addition of 10% strength by weight aqueous KOH solution (about 3–4 ml).

The two batches are then warmed to 90–95° C. in the course of 30–40 minutes and are subjected to condensation at this temperature up to a water-dilutability of 1:08 (duration: about 4 hours) and subsequently cooled to 25° C. in the course of 1.5 hours, with stirring.

As soon as the batches reach 65° C., a mixture of 11 g of technical grade toluenesulphonamide and 14 g of diethylene glycol is introduced into batch 17 and 25 g of the sulphonamide mixture of Example 6 according to the invention are introduced into batch 17a.

The resulting resins are brought to a solids content of 60% by weight by addition of water and introduced into bottles.

EXAMPLES 18 and 18a

Two resin batches as described in Examples 17 and 17a are subjected to condensation to a water-dilutability of 1:0.8.

The two batches are then cooled, with stirring, so that they reach 25° C. in the course of 1.5 hours. As soon as the batches reach 35° C., a mixture of 11 g of technical grade toluenesulphonamide and 14 g of diethylene glycol is introduced into batch 18 and 25 g of the sulphonamide mixture of Example 6 according to the invention are introduced into batch 18a. Whilst batch 18a is perfectly clear, batch 18 shows considerable cloudiness due to undissolved toluenesulphonamide.

The resulting resins are brought to a solids content of 60% by weight by addition of water and introduced into bottles.

USE EXAMPLE

The modified resins of Examples 16 to 18 and 16a to 18a are used for the production of a decoratively coated derived timber product as follows:

In each case 50 g of the resin solutions are first decanted for the storage life test.

In each case 0.9% by weight of the morpholine salt of p-toluenesulphonic acid as a hardener (this hardener is also used in the following examples), based on the solid resin, was added to the resin solutions which remain and the mixtures were stirred. Thereafter, the resins were brought to the impregnation concentration of 52% by addition of water. Marked flocculation of the resin, which, even after prolonged stirring, led to a persistent cloudiness and inhomogeneity of the resin, immediately occurred in resin 16 during this process. In each case a white decorative paper weighing 80 g/m² was then impregnated in the satisfactory impregnating liquors to a final weight of about 200 g/m² and dried to a residual moisture content of 5.5 to 7% by weight (5 minutes/160° C.). (The statement 5 minutes/160° C. means that, to determine the residual moisture content, a sample was kept at 160° C. for 5 minutes and the residual moisture content was calculated from the weight loss thus suffered.)

Each of the impregnated and dried papers was then divided into 3 parts and in each case one part was used for the following 3 pressing experiments.

(A) In each case one of the papers impregnated with resins 17 and 16a to 18a was subsequently pressed onto wood chipboards on a short-cycle press with a pressure of 22 bar at a temperature of 160° C. The moulding time of the press was 60 seconds. The surfaces of the coatings were evaluated in the customary manner in respect of gloss, uniformity and crack resistance on heating at 140° C. for 20 hours.

The findings obtained are summarised in the following Table 3.

TABLE 3

| Resin according to Example No. | Gloss (Reflection values at an incident angle of 60° C.) | Uniformity | Crack resistance | Average storage stability (days) |
| --- | --- | --- | --- | --- |
| 16 | Water-dilutability of the resin completely inadequate | | | |
| 16a | 95% | very good | perfectly satisfactory | still clear after 14 days |
| 17 | 80% | good | microcracks | significant cloudiness after 8 days |
| 17a | 85% | good | perfectly satisfactory | slight cloudiness after 9 days |
| 18 | Resin batch inhomogeneous, cloudy | | | |
| 18a | 85% | good | perfectly satisfactory | slight cloudiness after 9 days |

A wood pattern decorative paper (80 g/m²) was impregnated to a resin take-up of 58% and a sodium kraft paper (150 g/m²) was impregnated to a resin take-up of 53% using the resins of Examples 17 and 17a, after addition of 0.9% of a commercially available hardening accelerator. The impregnated papers were dried to a residual moisture content of 6.5% and then pressed in a double-belt press with a forward speed of 7 m/min at 160–162° C. under a pressure of 18 bar with the following build-up: resinated decorative paper, 2 resinated sodium kraft papers, 1 furniture parchment (non-resinated).

The continuous laminate produced using resin 17a has significantly better post-forming properties (subsequent deformability) in comparison with that produced using resin 17.

What is claimed is:

1. Modified melamine-formaldehyde resins which comprise a melamine-formaldehyde resin and 1 to 20% by weight, based on resin solids content, of sulphonamide compounds of the formula

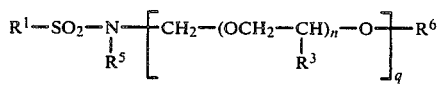

wherein
R$^1$ is phenyl, phenyl substituted phenyl, or alkyl substituted phenyl having 1 to 4 alkyl carbon atoms,
R$^3$ is hydrogen or alkyl having 1 to 4 carbon atoms,
R$^4$ is hydrogen or alkyl having 1 to 18 carbon atoms,
R$^5$ is hydrogen, alkyl having 1 to 4 carbon atoms, hydroxymethyl,

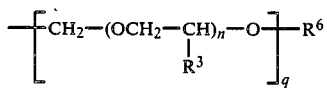

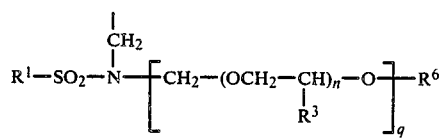

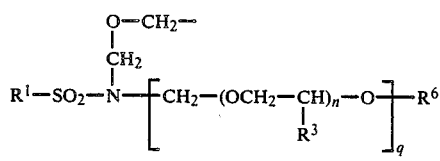

R$^6$ is hydrogen, alkyl having 1 to 18 carbon atoms or

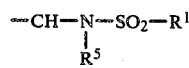

n is a number from 2 to 19,
q is 1, 2 or 3.

2. Modified melamine-formaldehyde resins according to claim 1 wherein the amount of said sulphonamide compounds is 2 to 10% by weight.

3. Modified melamine-formaldehyde resins according to claim 1 wherein the resin has a melamine:formaldehyde molar ratio of from 1:1.4 to 1:1.65.

4. A process for preparation of a modified melamine-formaldehyde resin which comprises reacting melamine and formaldehyde in a molar ratio of from 1:1.4 to 1:1.65 in the presence of from 1 to 20% by weight of sulphonamide compounds of the formula

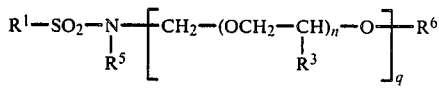

wherein
R$^1$ is phenyl, phenyl substituted phenyl, or alkyl substituted phenyl having 1 to 4 alkyl carbon atoms,
R$^3$ is hydrogen or alkyl having 1 to 4 carbon atoms,
R$^4$ is hydrogen or alkyl having 1 to 18 carbon atoms,
R$^5$ is hydrogen, alkyl having 1 to 4 carbon atoms, hydroxymethyl,

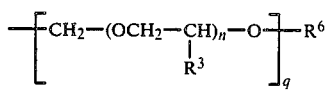

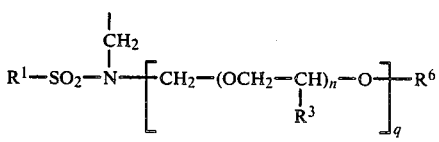

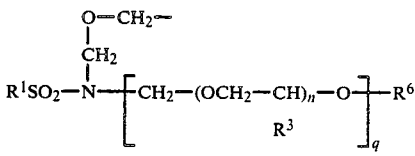

R$^6$ is hydrogen, alkyl having 1 to 18 carbon atoms or

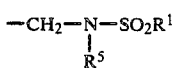

n is a number from 2 to 19,
q is 1, 2 or 3.

* * * * *